United States Patent
Shidemantle et al.

(10) Patent No.: US 7,641,390 B2
(45) Date of Patent: Jan. 5, 2010

(54) DIGITALLY MODIFIED RESISTIVE OUTPUT FOR A TEMPERATURE SENSOR

(75) Inventors: Jack P. Shidemantle, Springfield, OH (US); Robert A. Kill, Brighton, MI (US)

(73) Assignee: YSIS Incorporated, Beavercreek, OH (US)

( * ) Notice: Subject to any disclaimer, the term of this patent is extended or adjusted under 35 U.S.C. 154(b) by 83 days.

(21) Appl. No.: 12/101,962

(22) Filed: Apr. 12, 2008

(65) Prior Publication Data

US 2008/0195348 A1     Aug. 14, 2008

Related U.S. Application Data

(62) Division of application No. 10/783,491, filed on Feb. 20, 2004, now Pat. No. 7,484,887.

(60) Provisional application No. 60/448,692, filed on Feb. 20, 2003.

(51) Int. Cl.
  *G01K 7/00* (2006.01)
  *G01K 15/00* (2006.01)
  *G01R 35/00* (2006.01)

(52) U.S. Cl. .................. 374/183; 374/169; 374/1; 374/168; 712/133; 712/90; 712/104; 712/107; 712/99

(58) Field of Classification Search .............. 374/168, 374/183, 185, 169, 1; 702/107, 99, 104, 702/90, 91, 133
See application file for complete search history.

(56) References Cited

U.S. PATENT DOCUMENTS

| | | | |
|---|---|---|---|
| 3,526,135 A | 9/1970 | Wortz | |
| 3,704,803 A | 12/1972 | Ponder | |
| 3,872,726 A | 3/1975 | Kauffeld et al. | |
| 3,949,388 A | 4/1976 | Fuller | |
| 4,122,719 A | 10/1978 | Carlson et al. | |
| 4,241,303 A | 12/1980 | Thompson | |
| 4,302,971 A | 12/1981 | Luk | |
| 4,308,870 A | 1/1982 | Arkans | |

(Continued)

FOREIGN PATENT DOCUMENTS

DE     10220171     11/2003

(Continued)

OTHER PUBLICATIONS

Pompei, F. et al., "Arterial Thermometry Via Heat Balance at the Ear," Physicians Reference Handbook of Temperature, Exergen Corp. (1996).

(Continued)

*Primary Examiner*—Gail Verbitsky
*Assistant Examiner*—Mirellys Jagan
(74) *Attorney, Agent, or Firm*—Howard IP Law Group, PC

(57) ABSTRACT

A method for digitally controlling the resistive output of a temperature probe is disclosed. The system is comprised of a temperature sensor, a processor and a means under the control of the processor for modifying the resistive output such as a digital potentiometer. In one embodiment, the processor reads the temperature sensor and adjusts the potentiometer based on a correlative or predictive technique so as to provide a modified output that matches that of a standard resistive temperature probe and is compatible for display on a multi-parameter monitor.

8 Claims, 2 Drawing Sheets

U.S. PATENT DOCUMENTS

| | | |
|---|---|---|
| 4,314,143 A | 2/1982 | Bilstad et al. |
| 4,349,031 A | 9/1982 | Perlin |
| 4,428,382 A | 1/1984 | Walsall et al. |
| 4,476,872 A | 10/1984 | Perlin |
| 4,481,596 A | 11/1984 | Townzen |
| 4,566,808 A | 1/1986 | Pompei et al. |
| 4,576,487 A | 3/1986 | Conover et al. |
| 4,588,306 A | 5/1986 | Burger et al. |
| 4,602,642 A | 7/1986 | O'Hara et al. |
| 4,619,271 A | 10/1986 | Burger et al. |
| 4,629,336 A | 12/1986 | Ishizaka |
| 4,636,091 A | 1/1987 | Pompei et al. |
| 4,648,055 A | 3/1987 | Ishizaka et al. |
| 4,669,049 A | 5/1987 | Kosednar et al. |
| 4,709,704 A | 12/1987 | Lukasiewicz |
| 4,727,500 A | 2/1988 | Jackson et al. |
| 4,790,324 A | 12/1988 | O'Hara et al. |
| 4,863,281 A | 9/1989 | Suszynski |
| 4,883,366 A | 11/1989 | Dohi et al. |
| 4,911,559 A | 3/1990 | Meyst et al. |
| 4,993,419 A | 2/1991 | Pompei et al. |
| 5,012,813 A | 5/1991 | Pompei et al. |
| 5,015,102 A | 5/1991 | Yamaguchi |
| 5,018,872 A | 5/1991 | Suszynski et al. |
| 5,050,612 A | 9/1991 | Matsumura |
| 5,062,432 A | 11/1991 | James et al. |
| 5,073,034 A | 12/1991 | Beran et al. |
| 5,150,969 A | 9/1992 | Goldberg et al. |
| 5,168,874 A | 12/1992 | Segalowitz |
| 5,169,236 A | 12/1992 | Iest |
| 5,181,521 A | 1/1993 | Lemelson |
| 5,186,047 A | 2/1993 | Gordon et al. |
| 5,187,943 A | 2/1993 | Taniguchi et al. |
| 5,199,436 A | 4/1993 | Pompei et al. |
| 5,242,225 A | 9/1993 | Kasanami et al. |
| 5,243,297 A | 9/1993 | Perkins et al. |
| 5,271,407 A | 12/1993 | Pompei et al. |
| 5,293,877 A | 3/1994 | O'Hara et al. |
| 5,381,796 A | 1/1995 | Pompei |
| 5,441,476 A | 8/1995 | Kitado et al. |
| 5,445,158 A | 8/1995 | Pompei |
| 5,453,682 A | 9/1995 | Hinrichs et al. |
| 5,473,629 A | 12/1995 | Muramoto |
| 5,483,190 A | 1/1996 | McGivern |
| 5,511,553 A | 4/1996 | Segalowitz |
| 5,559,497 A | 9/1996 | Hong |
| 5,582,021 A | 12/1996 | Masauji |
| 5,617,868 A | 4/1997 | Harada et al. |
| 5,622,182 A | 4/1997 | Jaffe |
| 5,632,555 A | 5/1997 | Gregory et al. |
| 5,634,468 A | 6/1997 | Platt et al. |
| 5,653,238 A | 8/1997 | Pompei |
| 5,653,239 A | 8/1997 | Pompei et al. |
| 5,733,313 A | 3/1998 | Barreras, Sr. et al. |
| 5,738,441 A | 4/1998 | Cambridge et al. |
| 5,813,766 A | 9/1998 | Chen |
| 5,816,706 A | 10/1998 | Heikkila et al. |
| 5,818,044 A | 10/1998 | Sodickson et al. |
| 5,820,263 A | 10/1998 | Ciobanu |
| 5,839,094 A | 11/1998 | French |
| 5,857,775 A | 1/1999 | Vodzak et al. |
| 5,857,777 A | 1/1999 | Schuh |
| 5,874,736 A | 2/1999 | Pompei |
| 5,876,122 A | 3/1999 | Eryurek |
| 5,893,833 A | 4/1999 | Pompei et al. |
| 5,924,996 A | 7/1999 | Cho et al. |
| 5,938,619 A | 8/1999 | Dogre Cuevas |
| 5,957,854 A | 9/1999 | Besson et al. |
| 5,964,701 A | 10/1999 | Asada et al. |
| 5,991,700 A | 11/1999 | Clay et al. |
| 6,000,846 A | 12/1999 | Gregory et al. |
| 6,030,342 A | 2/2000 | Amano et al. |
| 6,036,361 A | 3/2000 | Gregory et al. |
| 6,047,205 A | 4/2000 | Pompei |
| 6,048,304 A | 4/2000 | Koch |
| 6,056,435 A | 5/2000 | Pompei |
| 6,059,452 A | 5/2000 | Smith et al. |
| 6,087,641 A | 7/2000 | Kinouchi et al. |
| 6,179,785 B1 | 1/2001 | Martinosky et al. |
| 6,220,750 B1 | 4/2001 | Palti |
| 6,238,354 B1 | 5/2001 | Alvarez |
| 6,270,252 B1 | 8/2001 | Siefer |
| 6,280,397 B1 | 8/2001 | Yarden et al. |
| 6,283,632 B1 | 9/2001 | Takaki |
| 6,289,238 B1 | 9/2001 | Besson et al. |
| 6,292,685 B1 | 9/2001 | Pompei |
| 6,300,871 B1 | 10/2001 | Irwin et al. |
| 6,355,916 B1 | 3/2002 | Siefert |
| 6,367,972 B1 | 4/2002 | Kamiyama et al. |
| 6,383,144 B1 | 5/2002 | Mooney et al. |
| 6,394,648 B1 | 5/2002 | Tseng |
| 6,402,371 B2 | 6/2002 | Pompei et al. |
| 6,439,768 B1 | 8/2002 | Wu et al. |
| 6,454,725 B1 | 9/2002 | Yu |
| 6,495,806 B2 | 12/2002 | Siefert |
| 6,496,705 B1 | 12/2002 | Ng et al. |
| 6,499,877 B2 | 12/2002 | Pompei |
| 6,544,173 B2 | 4/2003 | West et al. |
| 6,544,174 B2 | 4/2003 | West et al. |
| 6,577,893 B1 | 6/2003 | Besson et al. |
| 6,616,606 B1 | 9/2003 | Petersen et al. |
| 6,629,776 B2 | 10/2003 | Bell et al. |
| 6,631,287 B2 | 10/2003 | Newman et al. |
| 6,646,567 B1 | 11/2003 | Olivas |
| 6,839,651 B2 | 1/2005 | Lantz et al. |
| 2002/0026119 A1 | 2/2002 | Pompei |
| 2002/0143257 A1 | 10/2002 | Newman et al. |
| 2003/0045781 A1 | 3/2003 | Rosenheimer |
| 2003/0210146 A1 | 11/2003 | Tseng |
| 2004/0019293 A1 | 1/2004 | Schweitzer, Jr. et al. |
| 2004/0071188 A1 | 4/2004 | Knieriem et al. |
| 2004/0252750 A1 | 12/2004 | Gruszecki et al. |

FOREIGN PATENT DOCUMENTS

| | | |
|---|---|---|
| EP | 0411121 | 2/1991 |
| JP | 56027625 A | 3/1981 |
| JP | 58178234 A | 10/1983 |
| WO | 98/01730 | 1/1998 |
| WO | 98/08431 | 3/1998 |
| WO | 99/39166 | 8/1999 |
| WO | 01/01093 | 1/2001 |

OTHER PUBLICATIONS

Web page for Mini Mitter Physiological and Behavioral Monitoring for Humans and Animals, VitalSense, Integrated Physiological Monitoring System (date of first publication unknown). Applicants admit the status of this publication as prior art for the limited purpose of examination of this application, but otherwise reserve the right to challenge the status of this publication as prior art.

Higgins, K.T., "Engineering R & D: Temperature readings by remote control", Food Engineering (May 2003).

"What is a Blackbody and Infrared Radiation?" (date of first publication unknown). Applicants admit the status of this publication as prior art for the limited purpose of examination of this application, but otherwise reserve the right to challenge the status of this publication as prior art.

"Heat Transfer" (date of first publication unknown)). Applicants admit the status of this publication as prior art for the limited purpose of examination of this application, but otherwise reserve the right to challenge the status of this publication as prior art.

DIGITALLY MODIFIED RESISTIVE OUTPUT FOR A TEMPERATURE SENSOR

CROSS-REFERENCE TO RELATED APPLICATIONS

This application is a divisional of U.S. patent application Ser. No. 10/783,491, entitled DIGITALLY MODIFIED RESISTIVE OUTPUT FOR A TEMPERATURE SENSOR, filed Feb. 20, 2004, which also claims priority to the provisional U.S. Application Ser. No. 60/448,692, which was filed on Feb. 20, 2003, the disclosures and content of both of which are hereby incorporated by reference in their entireties.

FIELD OF THE INVENTION

This invention relates generally to temperature probes used in the medical field and more particularly to temperature probes that are connected to medical monitors used to measure conditions such as blood pressure, oxygen content in the blood and body temperature.

BACKGROUND OF THE INVENTION

Many medical monitors in use today have a port for connecting a temperature probe. This port is often used for connecting a resistive type probe where the monitor measures the resistance of the temperature probe to determine its temperature and thus the temperature of the tissue that the probe is in contact with.

Temperature probes, when they come in contact with a body that is at a temperature different from themselves, generally take about three minutes to adjust to the temperature of that body. The goal of some applications is to continuously measure a patient's temperature over a prolonged period of time such as during an operation. Waiting for a few minutes for a probe to come to temperature before an operation begins is acceptable but other temperature measurements require a faster response time. For example, when a practitioner is taking a patient's temperature once every hour it requires a quick response so the practitioner can acquire the temperature reading and then proceed to other duties.

Predictive type thermometers use techniques to determine or predict what the final stabilized temperature will be before the probe has reached thermal stability. These types of thermometers generally show the predicted temperature on an attached display and are usually not connected to a monitor where other vital signs are taken.

Previous to this invention, a monitor that has been constructed for use with a resistive temperature probe could not readily be adapted for use with a predictive temperature probe. This is because the monitor is designed to receive a resistive input to indicate temperature whereas the output from the predictive probe is a digital output of the temperature. Thus, the output from a predictive probe cannot be input to a monitor designed to receive an input from a resistive probe.

This invention in one embodiment allows a predictive temperature probe to be used with multipurpose monitors that are designed to receive resistive temperature inputs. A patient's temperature can be quickly taken and recorded on the same device as other vital signs. In another embodiment, this invention allows the resistive output of a temperature probe to be modified to reflect other corrections and adjustments as described herein in more detail.

SUMMARY OF THE INVENTION

In accordance with one embodiment of the invention, the resistive output of a temperature sensing device such as a thermistor is adjusted using predictive or correlative techniques and a modified resistive output is generated that is input to a multipurpose monitor. In one embodiment in particular, the sensed temperature is input to a microprocessor that determines a modified temperature reading that is translated in to a potentiometer setting required to achieve an output resistance that corresponds to the modified temperature reading.

DETAILED DESCRIPTION OF THE DRAWINGS

Figure 1:
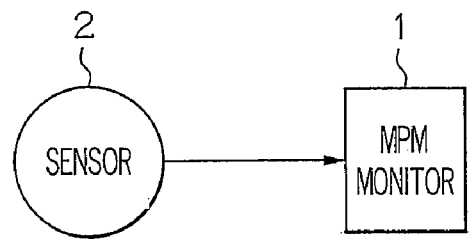
FIG. 1 is a diagram of a temperature probe connected to a medical monitor in a conventional manner.

With reference now to the drawings, and particularly to FIG. 1, there is shown a multiparameter medical monitor 1 with a sensor 2 connected to its temperature port in a conventional manner. The sensor 2 contains a temperature sensitive element such as a thermistor. The monitor includes conventional circuitry such as an ADC and a resistive bridge to monitor the resistive signal received from the sensor and displays the temperature reading. The resistance of the thermistor located in the tip of the probe changes in relation to the temperature. The monitor detects the probe resistance to determine the temperature at any given time.

Figure 2:
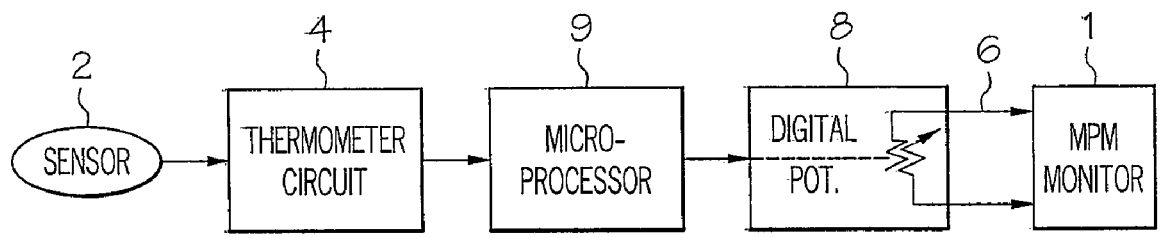
FIG. 2 is a diagram of a probe in accordance with one embodiment of the invention connected to a medical monitor by means of an interface in accordance with one embodiment of the invention.

FIG. 2 illustrates a medical monitor 1 with a sensor 2 and an interface in accordance with one embodiment of the invention. The interface includes thermometer circuitry 4 such as an ADC and a resistive bridge for obtaining a digital signal from the sensor. The output from the circuitry 4 is input to a microprocessor 9. The microprocessor 9 may employ correlative or predictive techniques or algorithms to determine a temperature for reporting to the monitor 1. In one embodiment, the microprocessor 9 executes a correlation algorithm or uses a look up table to report a temperature to the monitor 1. For example, if the thermistor is being used to measure skin or temporal temperature, the microprocessor may correlate the measured temperature with a temperature such as internal body or core body temperature. In another embodiment the processor may use a predictive algorithm to convert a temperature reading taken shortly after the thermistor is placed, i.e., during a period of thermal instability, to a final predicted temperature before thermal stability actually occurs so as to provide a more rapid temperature reading. In any case, the temperature that is measured by the probe is converted to a resistance output 6 that is input to the monitor 1 that corresponds to a modified or corrected reading that the clinician desires to monitor. The microprocessor 9 adjusts the resistance output from the sensor 2 by sending a signal to the digital potentiometer 8 that sets the resistance of the digital potentiometer 8 such that the resultant resistance observed at the output 6 is indicative of the temperature that is to be displayed on the monitor as determined by the microprocessor. For example, a commercially-available 1024-step digital potentiometer may be set by digital input from the microprocessor to a value that corresponds to the resistance of an equivalent thermistor probe at the measured temperature. The interface circuit may use isolation devices and isolated power supplies to preserve the safety isolation of the monitor. In a particular embodiment, there will be no direct galvanic connection between the monitor and the interface circuit.

The present invention is particularly useful in conjunction with a YSI 400 series temperature probe which has a single thermistor output. In accordance with this embodiment of the invention, the 400 series output is modified by the microprocessor as illustrated in FIG. 2.

Figure 3:
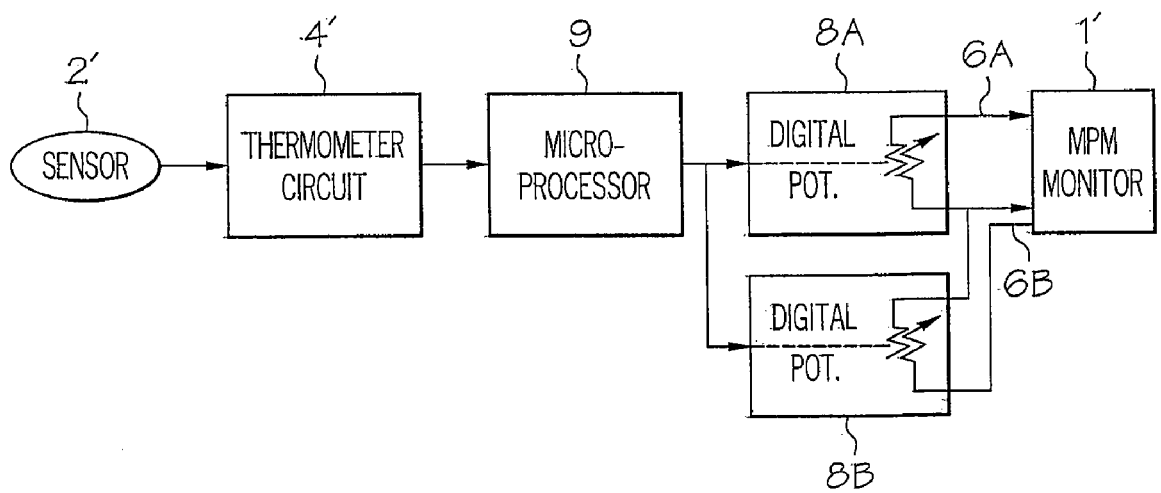
FIG. 3 is a diagram of a probe having two thermistor outputs connected to a monitor via an interface in accordance with another embodiment of the invention.

The invention is also useful to simulate the output of a YSI 700 series temperature probe. This probe is different than the 400 series probe in that it includes two thermistors sandwiched together. As such, this probe includes two thermistor outputs. FIG. 3 illustrates a medical monitor 1' with a sensor 2' and an interface in accordance with one embodiment of the invention. The interface includes thermometer circuitry 4' such as an ADC and a resistive bridge for obtaining a digital signal from the sensor. The output from the circuitry 4' is input to a microprocessor 9. The microprocessor 9 employs correlative or predictive techniques or algorithms to determine a temperature for reporting to the monitor 1'. In this embodiment, the interface includes two digital potentiometers 8A and 8B and the microprocessor 9 adjusts the resistance for each of the thermistor outputs by sending signals to the respective digital potentiometers. The adjusted outputs 6A and 6B are input to the monitor 1'. As a further manifestation of the invention, an interface may be provided with two digital potentiometers that can be used with a series 400 probe or a series 700 probe or their equivalent. In this embodiment, when used with a series 400 probe, only one of the potentiometers would be adjusted whereas when used with a series 700 probe, both would be adjusted.

Figure 4:
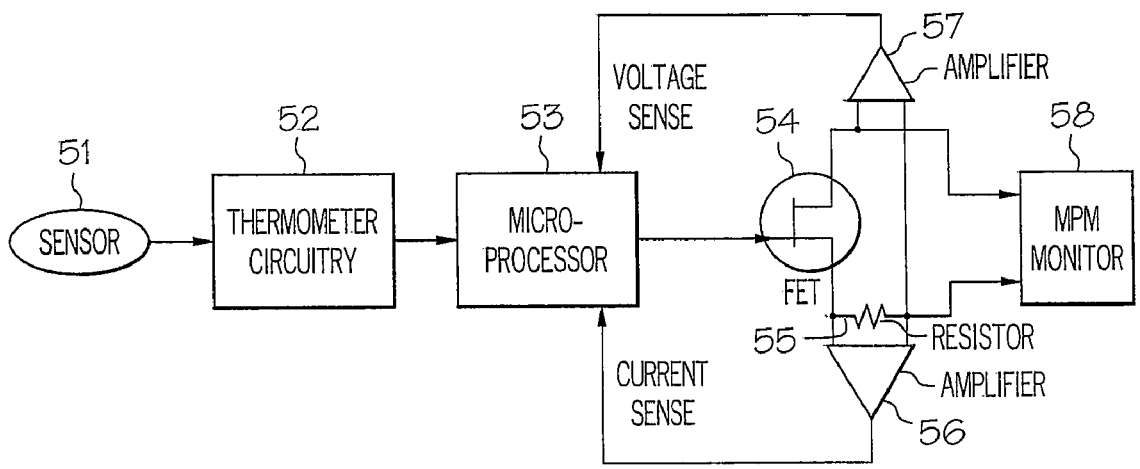
FIG. 4 is a diagram of probe and an interface that utilizes a field effect transistor (FET) to modify resistance of a probe in accordance with one embodiment of the invention.

A further embodiment of the invention uses a FET in place of the digital potentiometer to modify the resistive output and is illustrated in FIG. 4. Temperature is measured with a sensor 51 and converted to digital form using circuitry 52. A microprocessor 53 calculates the modified thermistor resistance as described above. A FET 54 is connected to the input of the monitor 58, and the gate of the FET is controlled by an analog output of the microprocessor 53. The source-drain voltage of the FET is measured with a high-impedance differential amplifier 57 and connected to an analog input of the microprocessor 53. The source current of the FET is measured by a low-value (e.g., less than 10 ohms) resistor 55 connected to the source terminal. The voltage across this resistor is amplified by amplifier 57 and sent to the microprocessor 53. The microprocessor calculates current from the voltage reading, given the known value of the source resistor. The microprocessor divides the voltage input by the current to get the equivalent resistance of the FET. This resistance is compared with the desired resistance and any difference is applied as negative feedback to the FET gate. Therefore the thermistor equivalent resistance can be obtained despite the non-linear characteristics of the FET.

If the polarity of the monitor 58 is not compatible with the FET configuration shown in FIG. 4, those skilled in the art will recognize that the FET may alternatively be connected in the reverse of the configuration illustrated in FIG. 4. Most FETs will function in this mode, although at lower gain. The feedback loop compensates for this lower gain. Furthermore, some monitors may apply pulsed or variable voltages to the thermistor input. The microprocessor 53 may measure the peak-to-peak voltages for these cases to obtain the voltage and current readings needed to compute the resistance. The interface circuit will be isolated from the monitor as described above using isolation devices and isolated power supplies to preserve the safety isolation of the monitor. For use with a monitor that is designed with inputs for more than one thermistor, the FET configuration is duplicated analogous to FIG. 3.

Figure 5:
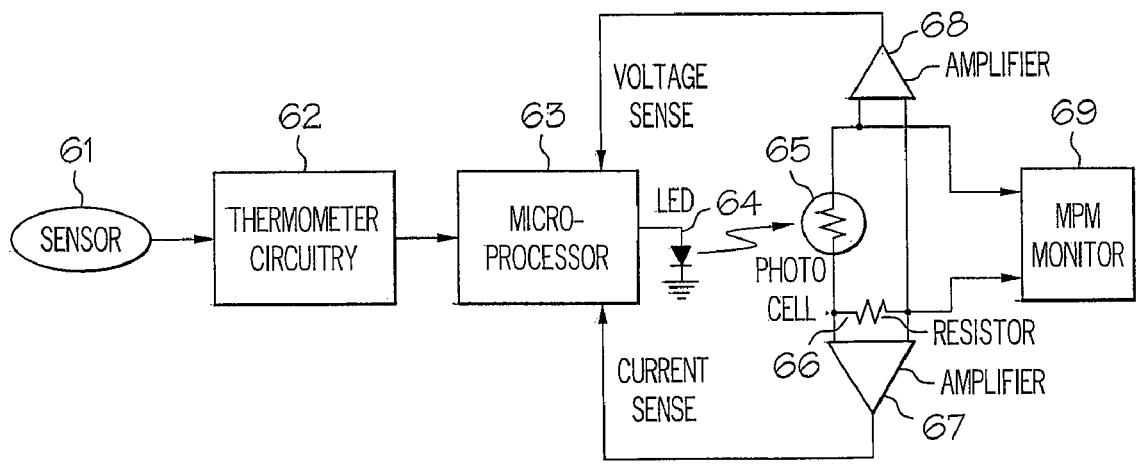
FIG. 5 is a diagram of a probe and interface which utilizes a photocell to modify resistance of a probe in accordance with one embodiment of the invention.

In a further embodiment illustrated in FIG. 5, a cadmium sulfide photocell 65 is used in place of the FET in FIG. 4. Temperature is measured with a sensor 61 and converted to digital form using circuitry 62. A microprocessor 63 calculates the modified thermistor resistance as described above. A light-emitting diode (LED) 64 connected to a microprocessor analog output is used to illuminate the photocell 65. The LED current is adjusted to obtain the desired photocell resistance. A negative feedback loop is used to compensate for the photocell nonlinearity as in the FET method. The current amplifier 67 and voltage amplifier 68 transmit current and voltage information to the microprocessor to compute equivalent resistance of the photocell. The photocell is a non-polarized device, so there is no problem with reverse connection to the monitor 69. For use with a monitor that is designed with inputs for two thermistors, the LED/photocell configuration can be duplicated analogous to FIG. 3.

Other embodiments of this invention can be foreseen where the temperature to be reported to the medical monitor is determined from some other means. The temperature could be reported to the microprocessor via a serial port and then reported to the medical monitor via the resistive output.

What is claimed is:

1. An interface for a monitor and a temperature probe including a temperature sensor, said interface comprising:
   a logic circuit for modifying a resistive output of the temperature sensor to determine a modified resistive output for the temperature sensor; and
   a means for providing the modified resistive output, wherein the means for providing the modified resistive output is compatible with the monitor such that the monitor can display a temperature that corresponds to the modified resistive output from said means, said means including a digital potentiometer,
   wherein the logic circuit sends a control signal to the digital potentiometer such that the potentiometer provides the modified resistive output to the monitor.

2. The interface of claim 1, wherein the means for providing the modified resistive output includes two digital potentiometers.

3. The interface of claim 1, wherein the logic circuit is programmed to execute a predictive or a correlative algorithm.

4. The interface of claim 3, wherein the logic circuit is a microprocessor.

5. A temperature probe comprising:
   a temperature sensor having a resistive output;
   a processor for modifying the resistive output of the temperature sensor to determine a modified resistive output for the temperature sensor, the processor being programmed to execute a predictive or a correlative algorithm; and a digital potentiometer for providing the modified resistive output to a monitor in response to a signal from the processor, wherein the algorithm converts the resistive output of the temperature sensor during a thermally unstable condition to a modified resistive output representative of a predicted temperature during a condition of thermal stability.

6. The temperature probe of claim 5, wherein the probe includes two digital potentiometers.

7. A method for digitally modifying the resistive output of a temperature sensor, said method comprising the steps of:

inputting the resistive output from the temperature sensor to a logic circuit;

implementing a predictive or a correlative algorithm using the logic circuit to modify the resistive output to determine a modified resistive output; and signaling a digital potentiometer to adopt a setting corresponding to the modified resistive output; wherein the digital potentiometer outputs a resistance corresponding to the modified resistive output.

8. The method of claim 7, wherein the signaling step comprises signaling two digital potentiometers to adopt a setting corresponding to the modified resistive output.

* * * * *